(12) United States Patent
Du et al.

(10) Patent No.: US 8,616,069 B2
(45) Date of Patent: Dec. 31, 2013

(54) FIBER OPTIC SENSOR BASED ON SPIRAL STRUCTURE

(75) Inventors: Bing Du, Shaanxi (CN); Wei Du, Shaanxi (CN); Yingtao Du, Shaanxi (CN)

(73) Assignee: Xian Genher Optical Tech. Company, Shaanxi (CN)

( * ) Notice: Subject to any disclaimer, the term of this patent is extended or adjusted under 35 U.S.C. 154(b) by 0 days.

(21) Appl. No.: 13/529,780

(22) Filed: Jun. 21, 2012

(65) Prior Publication Data

US 2012/0272744 A1 Nov. 1, 2012

Related U.S. Application Data

(63) Continuation of application No. PCT/CN2011/072457, filed on Apr. 6, 2011.

(30) Foreign Application Priority Data

Apr. 6, 2010 (CN) .......................... 2010 1 0140077

(51) Int. Cl.
*G01L 1/24* (2006.01)

(52) U.S. Cl.
USPC ........................................ 73/800; 250/227.16

(58) Field of Classification Search
USPC ........................................ 73/800; 250/227.16
See application file for complete search history.

(56) References Cited

U.S. PATENT DOCUMENTS

| | | | | |
|---|---|---|---|---|
| 4,253,727 A | * | 3/1981 | Jeunhomme et al. | 385/37 |
| 4,294,513 A | * | 10/1981 | Nelson et al. | 385/4 |
| 4,421,979 A | * | 12/1983 | Asawa et al. | 250/227.16 |
| 4,449,210 A | * | 5/1984 | Myer | 367/149 |
| 4,463,254 A | * | 7/1984 | Asawa et al. | 250/227.16 |
| 4,468,090 A | * | 8/1984 | Ulrich et al. | 385/11 |

(Continued)

FOREIGN PATENT DOCUMENTS

| | | |
|---|---|---|
| CN | 101840027 A | 9/2010 |
| CN | 101881633 A | 11/2010 |

(Continued)

OTHER PUBLICATIONS

English Translation of the Written Opinion of the International Search Authority. Oct. 6, 2012. Obtained online on Aug. 7, 2013 at <http://www.wipo.int/portal/index.html.en>.*

(Continued)

*Primary Examiner* — Harshad R Patel
*Assistant Examiner* — Punam Roy
(74) *Attorney, Agent, or Firm* — Kramer & Amado P.C.

(57) ABSTRACT

A fiber optic sensor based on spiral structure is a multi-loop spiral member formed by spring wire. A plurality of deformation teeth are continuously distributed on the upper surface and the lower surface (12) of the spring wire in a longitudinal direction along the spring wire; in two adjacent loops of the spring wire, the deformation teeth on the lower surface of the upper loop of the spring wire and the deformation teeth on the upper surface of the lower loop of the spring wire correspond to each other in a staggered way. A signal optical fiber is clamped between the deformation teeth on the lower surface of the upper loop of the spring wire and the deformation teeth on the upper surface of the lower loop of the spring wire, and connected to a test unit (5) by a transmission optical fiber.

10 Claims, 10 Drawing Sheets

(56) References Cited

U.S. PATENT DOCUMENTS

| | | | | |
|---|---|---|---|---|
| 4,552,026 | A | * | 11/1985 | Knudsen et al. ............ 73/861.24 |
| 4,560,016 | A | * | 12/1985 | Ibanez et al. ............... 177/210 R |
| 4,618,764 | A | * | 10/1986 | Harmer .................... 250/227.14 |
| 4,725,124 | A | * | 2/1988 | Taylor ................................ 385/4 |
| 5,164,605 | A | * | 11/1992 | Kidwell ........................ 250/577 |
| 5,271,675 | A | * | 12/1993 | Fagan et al. ................... 374/110 |
| 5,293,039 | A | * | 3/1994 | Mongiols ................. 250/227.16 |
| 7,098,445 | B2 | * | 8/2006 | Ishihara .................... 250/227.14 |
| 2001/0055438 | A1 | * | 12/2001 | Tweedy et al. .................. 385/12 |

FOREIGN PATENT DOCUMENTS

| | | | |
|---|---|---|---|
| CN | 101922989 | A | 12/2010 |
| CN | 101930014 | A | 12/2010 |
| CN | 2012697734 | U | 1/2011 |
| CN | 201772966 | U | 3/2011 |
| CN | 201802966 | U | 4/2011 |
| CN | 201859151 | U | 6/2011 |
| GB | 2204679 | A | 11/1988 |
| JP | 61-120981 | A | 6/1986 |
| JP | 61-170623 | A | 8/1986 |
| JP | 1-176618 | A | 7/1989 |
| JP | 05073797 | A * | 3/1993 |
| SU | 1509794 | A1 | 11/1989 |

OTHER PUBLICATIONS

Yoshino, T.; Inoue, K.; Kobayashi, Y., "Spiral fibre microbend sensors," Optoelectronics, IEE Proceedings—, vol. 144, No. 3, pp. 145,150, Jun. 1997.*

Xing, Xuening et al., "Optical Fiber's Bend Loss and Microbend Loss and Its Applications," China Cable Television, No. 23, pp. 24-26, 2004, ISSN 1007-7022.

International Search Report ssued for corresponding PCT/CN2011/072457.

* cited by examiner

FIBER OPTIC SENSOR BASED ON SPIRAL STRUCTURE

PRIORITY

This application is a continuation of and claims priority to PCT Application No. PCT/CN2011/072457 filed Apr. 6, 2011, and claims priority to CN Application No. 201010140077.0, filed on Apr. 6, 2010. The entire disclosures of the PCT Application No. PCT/CN2011/072457 published as WO2011/124126, and CN Application No. 201010140077.0 are hereby incorporated by reference in their entirety.

FIELD OF THE INVENTION

The present invention relates to a fiber optical sensor in the field of sensor technology, more specifically, to a spiral type of fiber optical sensor for testing a stress parameter with high precision.

BACKGROUND OF THE INVENTION

Various kinds of fiber optical sensors are available, which generally comprise light intensity-modulated fiber optic sensor, fiber optical grating sensor, interference fiber optical sensor, etc. The latter two are characterized by high sensor sensitivity. However, they have the disadvantages of complexity in apparatus, high cost in operation, etc. during the application, whereby the application of the fiber optical sensors is significantly limited. Especially for the fiber optical sensor with higher sensitivity, for example, interference fiber optical sensor, it may response to the changes in various environment conditions due to its high sensitivity during the process of use. However, when it is applied under the practical conditions, its operational parameters may be affected by the environment factors of temperature, air pressure, vibration, etc. Therefore, when it is used, a lot of measures will have to be taken to prevent and remove the influences of the above environment factors so that the structure of the monitoring apparatus gradually tends complex and the cost for use in operation is greatly increased.

Fiber optical microbend sensor is a light intensity-modulated sensor and is characterized by lower cost, high sensitivity and certain capacity of anti-interference of the environment. It is achieved based on the bend or microbend loss of the optical fiber. The change in the light power is caused by changing the bend degree of the optical fiber.

The principle of the loss of light power is that the bend loss may generate when the optical fiber receives a bend disturbance, generally being a microbend loss and a macrobend loss. Both of the bend losses are caused by the guided-mode coupling of part of the fiber core to the cladding when the optical fiber is bended, which may be calculated according to the theoretical formula of Marcuse as follows:

$$P_{OUT}=P_{IN}\exp(-\gamma S),$$

wherein $P_{IN}$ and $P_{OUT}$ are the input and output power of the light, respectively, $\gamma$ is the coefficient of a bend loss, and S is the length of a bend arc. It can be seen that the larger the coefficient of the bend loss $\gamma$ is, that is, the smaller the bend radius of the optical fiber is, the larger the loss is. However, too small bend radius may cause the significantly reduced lifespan of the optical fiber and influence the service life of the sensor, whereby the bend radius of the optical fiber in practical use is limited. On the other hand, with the same coefficient of the bend loss $\gamma$, the attenuation may be increased if the bend arc S is increased. The length of bend arc S may be significantly increased for the purpose of greatly improving dynamic range and precision of the fiber optical attenuator.

The solution proposed in the CN Patent No. 8710210 achieves a fiber optical stress meter mainly with the microbend loss of optical fiber. However, as the fiber optical stress meter is obtained by two flat plates, which may not be very large, the length of the optical fiber which may be bended is limited, thereby preventing the improvement of dynamic range and precision of such a fiber optical attenuator. In addition, the largest adjusted distance between the two flat plates in relative movement is only several hundreds of micrometers, and the two flat plates must maintain parallel substantially in movement. Therefore, higher demand on the adjusted mechanical structure by such an attenuator not only increases the cost for implement, but also limits the improvement of dynamic range and precision of the fiber optical attenuator.

SUMMARY OF THE INVENTION

Technical Problem

To overcome the drawbacks in the above prior art, the present invention is to provide a spiral type of fiber optic sensor with high precision based on the bend loss of the optical fiber, which has a simple structure, a proper design, convenience in operation and a flexible manner of use, and has a certain capacity of anti-interference of the environment and high sensitivity, so as to have a wide range of application. Further, the fiber optical sensor of the present invention has a great advantage in cost, because the present fiber optical sensor is measured based on the bend loss of the optical fiber, while the test of loss is the basis of all of the interference method, frequency method and other type of test in the test of optical fiber, and also is the most mature and stable technology with lowest cost. And, the quasi-distributive or distributive measurement may be achieved by using the technologies of Time Division, Optical Time Domain Reflection (OTDR) and correlated Frequency Modulated Continuous Wave (FMCW), which provide a very wide application prospect for the fiber optical sensor of the present invention.

Technical Solution to be Solved

To solve the above technical problems, one aspect in the present invention is to provide a fiber optical sensor based on spiral structure, characterized by a multi-loop spiral member formed by a spring wire, wherein a plurality of first deformation teeth are continuously distributed on an upper surface and a lower surface of the spring wire in a longitudinal direction along the spring wire; in two adjacent loops of the spring wire, the first deformation teeth on the lower surface of the upper loop of the spring wire and the first deformation teeth on the upper surface of the lower loop of the spring wire correspond to each other in a staggered way; a first signal optical fiber is clamped between the first deformation teeth on the lower surface of the upper loop of the spring wire and the deformation teeth on the upper surface of the lower loop of the spring wire; the positions of both ends of the spiral member are changed when a stress is applied thereon, and the distance between the two adjacent loops of the spring wire in the spiral member is changed such that the position between the first deformation teeth on the lower surface of the upper loop of the spring wire and the deformation teeth on the upper surface of the lower loop of the spring wire in the two loops of the spring wire is changed, and as a result, the bend curvature of the first signal optical fiber clamped between the two deformation teeth is changed; and the first signal optical fiber is connected to a test unit via a transmission optical fiber.

When the positions of both ends of the spiral member are changed, for example, the spiral member is strengthened under a pull stress or shortened under a compress stress, the distance between two adjacent loops among the plurality sets of the adjacent loops of the spring wire forming the spiral member is increased or reduced such that the position between the first deformation teeth on the lower surface of the upper loop of the spring wire and the deformation teeth on the upper surface of the lower loop of the spring wire in two adjacent loops among the plurality sets of the adjacent loops of the spring wire is increased or reduced. As a result, the bend curvature of the first signal optical fiber clamped between the deformation teeth of two adjacent loops of the spring wire is reduced or increased, and the increased or reduced power of the light signal transmitted in the first optical fiber is caused. The first signal optical fiber is connected to a test unit via a transmission optical fiber, so that the change in power of the light signal is detected by the test unit. The test unit may be a light source and a light power meter. The quasi-distributive or distributive measurement may also be achieved by a test apparatus adopting the technologies of Optical Time Domain Reflection (OTDR) and correlated Frequency Modulated Continuous Wave (FMCW).

A further technical aspect to be solved by the fiber optical sensor of the present invention is that the spiral member is in a spiral shape or a shape of flat coil spring.

A further technical aspect to be solved by the fiber optical sensor of the present invention is that a layer of elastic material is provided between the upper and lower surfaces of the spring wire forming the spiral member. The layer of elastic material may be formed by macromolecular materials, wave springs or the like. A greater deformation is generated when an outer force is applied to the layer of elastic material. Therefore, when the positions of both ends of the spiral member are changed, the relative position between the deformation teeth on the lower surface of the upper loop of the spring wire and the deformation teeth on the upper surface of the lower loop of the spring wire in the two adjacent loops of the spring wire is slightly changed.

A further technical aspect to be solved by the fiber optical sensor of the present invention is that the height of the first deformation teeth distributed on the surface of the spring wire or the distance between the first deformation teeth distributed on the upper surface of the spring wire or the distance between the first deformation teeth distributed on the lower surface of the spring wire is changed.

A further technical aspect to be solved by the fiber optical sensor of the present invention is that a second signal optical fiber is clamped in parallel to the first signal optical fiber between the first deformation teeth on the lower surface of the upper loop of the spring wire and the first deformation teeth on the upper surface of the lower loop of the spring wire in two adjacent loops of the spring wire.

A further technical aspect to be solved by the fiber optical sensor of the present invention is that second deformation teeth are provided on the upper and lower surfaces of the spring wire, respectively, and a second signal optical fiber is clamped between the second deformation teeth on the lower surface of the upper loop of the spring wire and the second deformation teeth on the upper surface of the lower loop of the spring wire in two adjacent loops of the spring wire.

A further technical aspect to be solved by the fiber optical sensor of the present invention is that the section of the spring wire is in a shape of round, elliptic, rectangular or circular ring.

A further technical aspect to be solved by the fiber optical sensor of the present invention is that the test unit is connected to a processing unit.

A further technical aspect to be solved by the fiber optical sensor of the present invention is that the signal optical fiber is an optical fiber having a plurality of layers for protection in the outside, such as tight-buffered optical fiber, carbon-coated optical fiber, polyimide-coated optical fiber.

A further technical aspect to be solved by the fiber optical sensor of the present invention is that the signal optical fiber is a multi-core optical fiber, a macromolecular polymer optical fiber or a photon crystal optical fiber.

Advantageous Effects

The present invention has the following advantages compared to the prior art.

Firstly, its structure is simple, manufacturing is easy and it has various structure forms, and the manner of use is flexible.

Secondly, the operation is simple and convenient, and the connection relations among the respective components are proper designed. The spiral member and the test unit for the bend loss of the optical fiber are used cooperatively so as to achieve the purpose of the real-time, accurate, and reliable and quickly test of the applied force in a large range.

Thirdly, the cost for producing and operating is low, the effect of use is good, practical value is high and economical benefit is significant. The structure of the prior test device is simplified and the cost for producing and operating is reduced, while the influence of environment factors on the test results may also be reduced. Therefore, the test effect is accurate and it is easy for implement, and accurate detection may be carried out by use of the macrobend loss and the microbend loss of the optical fiber at the same time.

Fourthly, as the spiral member is in a spiral shape or a shape of flat coil spring, a force F is applied to the signal optical fiber by the deformation teeth on the two adjacent loops of the spring wire in the spiral member under the application of the outer stress F of stretching, compressing or twisting and so on. The signal optical fiber receives the force so that the microbend loss is caused, thereby the effective length of the microbend optical fiber generated is greatly increased, and thus the sensitivity of test is improved.

Fifthly, it may be used as the adjusted attenuator of the optical fiber.

Sixthly, when the outer stress F is applied to one of or both ends of the spiral member, and thus the spiral member is in a bend state as a whole, the bend radius of the spiral member as a whole can be evaluated accurately by the processing unit according the data detected by the test unit for the bend loss of the optical fiber.

Seventhly, for the spiral member in the spiral shape, on each circumference of approximately 360°, in the case that the height of the opposing deformation teeth or the teeth distance between the deformation teeth on the two adjacent loops of the spring wire is uniformly and gradually increased or reduced, the application direction of the outer stress F to any position on the spiral member may be evaluated.

Eighthly, as the spiral member is in a spiral shape or a shape of flat coil spring as a whole, the size of torque or the twisted angle may be calculated according to the loss of the signal optical fiber under the application of rotational or twisted force.

To summarize, the present invention has a simple structure and a proper design, is easy to produce, and has a flexible manner of use, high sensitivity and a well effect of use. The detection can be performed simultaneously by using a macrobend loss and a microbend loss of the optical fiber so that the dynamic range is larger and the test results are more sensitive and accurate. In addition to the application of testing the pressure stress parameter by the bend loss of the optical fiber in the prior art, the test may be expanded to other physical quantities, including pull stress, bend curvature, direction of bend, twist angle and torque. The application range may be further expanded.

DENOTATION OF ACCOMPANYING DRAWINGS

1—transmission fiber
4—spiral member
5—test unit
6—first signal optical fiber
7—processing unit
8—second signal optical fiber
10—layer of the upper surface of the spring wire
11—layer of elastic material
12—layer of the lower surface of the spring wire
4-1—first deformation teeth on the lower surface of the spring wire
4-2—first deformation teeth on the upper surface of the spring wire
4-3—second deformation teeth on the lower surface of the spring wire
4-4—second deformation teeth on the upper surface of the spring wire
4-5—first deformation teeth on the outer surface of the inner loop of the spring wire
4-6—first deformation teeth on the inner surface of the outer loop of the spring wire

BEST EMBODIMENTS OF THE PRESENT INVENTION

The First Embodiment

Figure 1:
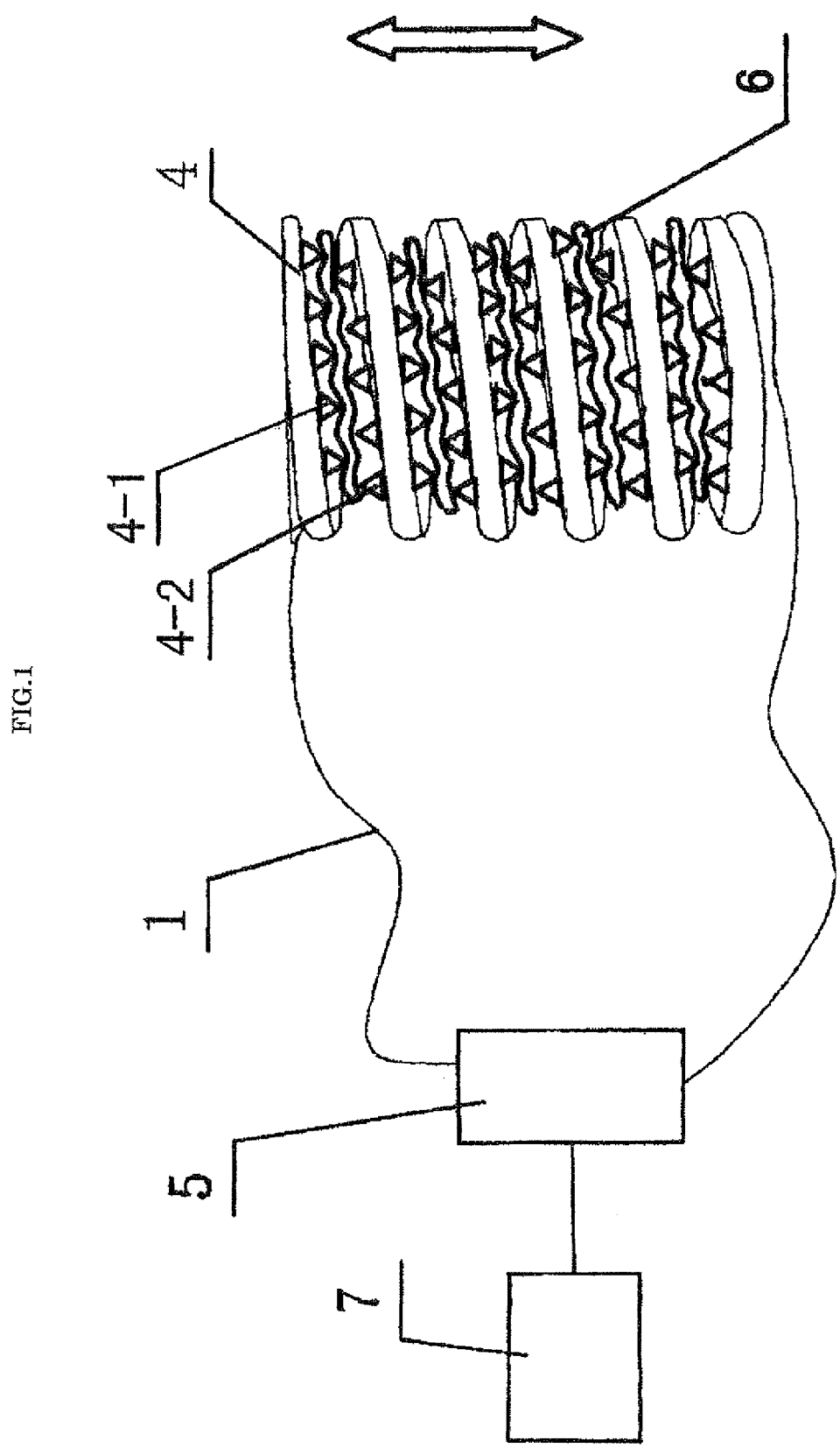
FIG. 1 is the view schematically illustrating the structure of the first embodiment according to the present invention.
Figure 2:
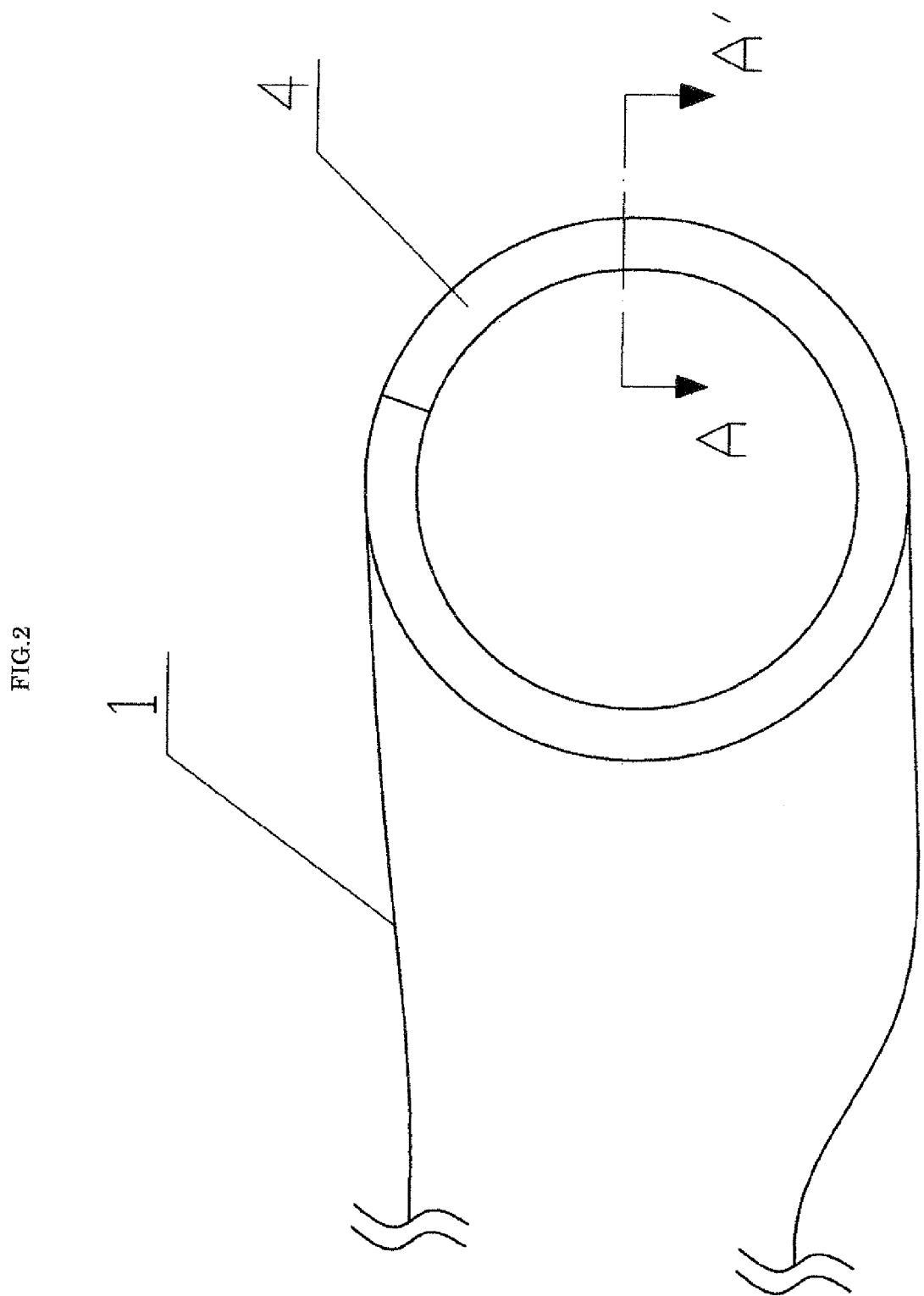
FIG. 2 is the top view schematically illustrating the spiral member in FIG. 1.
Figure 3:
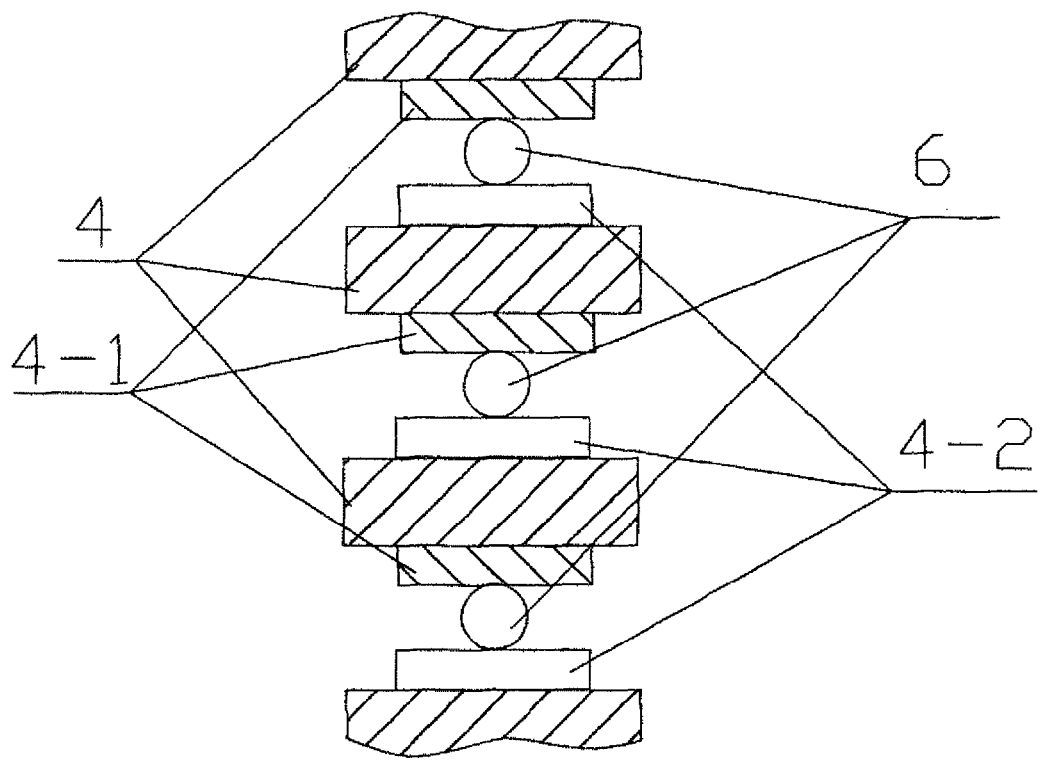
FIG. 3 is the schematically partial cross-sectional view taken along the direction A-A' of the spiral member in FIG. 2.

As shown in FIGS. 1, 2 and 3, the present invention comprises a multi-loop spiral member 4 formed by a spring wire. A plurality of deformation teeth are continuously distributed on an upper surface and a lower surface of the spring wire in a longitudinal direction along the spring wire; in two adjacent loops of the spring wire, the first deformation teeth 4-1 on the lower surface of the upper loop of the spring wire and the first deformation teeth 4-2 on the upper surface of the lower loop of the spring wire correspond to each other in a staggered way. A first signal optical fiber 6 is clamped between the first deformation teeth 4-1 on the lower surface of the upper loop of the spring wire and the deformation teeth 4-2 on the upper surface of the lower loop of the spring wire. The positions of both ends of the spiral member 4 are changed when the stress is applied thereon, and the distance between the adjacent loops of the spring wire in the spiral member 4 is changed such that the position between the first deformation teeth 4-1 on the lower surface of the upper loop of the spring wire and the deformation teeth 4-2 on the upper surface of the lower loop of the spring wire in the two loops of the spring wire is changed. As a result, the bend curvature of the first signal optical fiber 6 clamped between the deformation teeth of two loops of the spring wire is changed, and thus the power of the light signal transmitted in the first optical fiber 6 is changed. The first signal optical fiber 6 is connected by a transmission optical fiber 1 to a test unit 5, which is connected to a processing unit.

In this embodiment, the spiral member 4 is in the form of a spiral structure as a whole. When the positions of both ends of the spiral member 4 are changed, for example, the spiral member 4 is strengthened under a pull stress or shortened under a compress stress, the distance between two adjacent loops among the plurality sets of the adjacent loops of the spring wire forming the spiral member 4 is increased or reduced such that the position between the first deformation teeth 4-1 on the lower surface of the upper loop of the spring wire and the deformation teeth 4-2 on the upper surface of the lower loop of the spring wire in the two adjacent loops among the plurality sets of the adjacent loops of the spring wire is increased or reduced. As a result, the bend curvature of the first signal optical fiber 6 clamped between the deformation teeth of two adjacent loops of the spring wire is reduced or increased, and the increased or reduced power of the light signal transmitted in the first optical fiber 6 is caused. The first signal optical fiber 6 is connected to a test unit 5 via a transmission optical fiber 1, so that the change in power of the light signal is detected by the test unit. The test unit 5 may be a light source and a light power meter, The quasi-distributive or distributive measurement may also be achieved by a test apparatus adopting the technology of Optical Time Domain Reflection (OTDR).

The first signal optical fiber 6 is an optical fiber having a plurality of layers for protection in the outside, such as tight-buffered optical fiber, carbon-coated optical fiber, polyimide-coated optical fiber, and so on. The first signal optical fiber 6 may also be a plastic optical fiber or a photon crystal optical fiber.

The Second Embodiment

Figure 4:
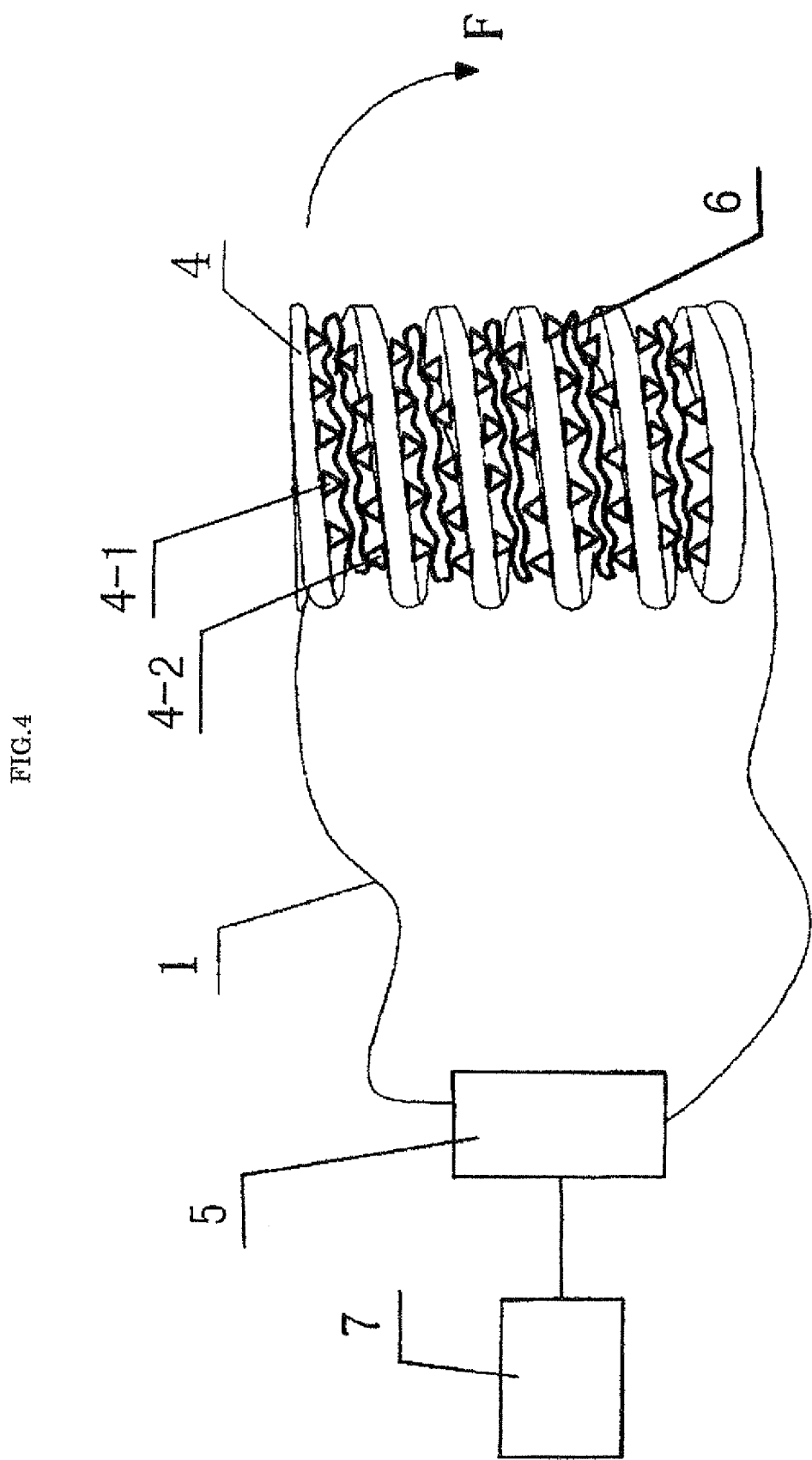
FIG. 4 is the view schematically illustrating the structure of the second embodiment according to the present invention.

As shown in FIG. 4, in this embodiment, the difference with the first embodiment is that the applied direction F of the outer stress to the spiral member 4 is the direction of twist, that is, the spiral member is twisted from the upper or lower end. In this embodiment, the structures, connection relations and operational principles of other portions are the same as those in the first embodiment.

The Third Embodiment

Figure 6:
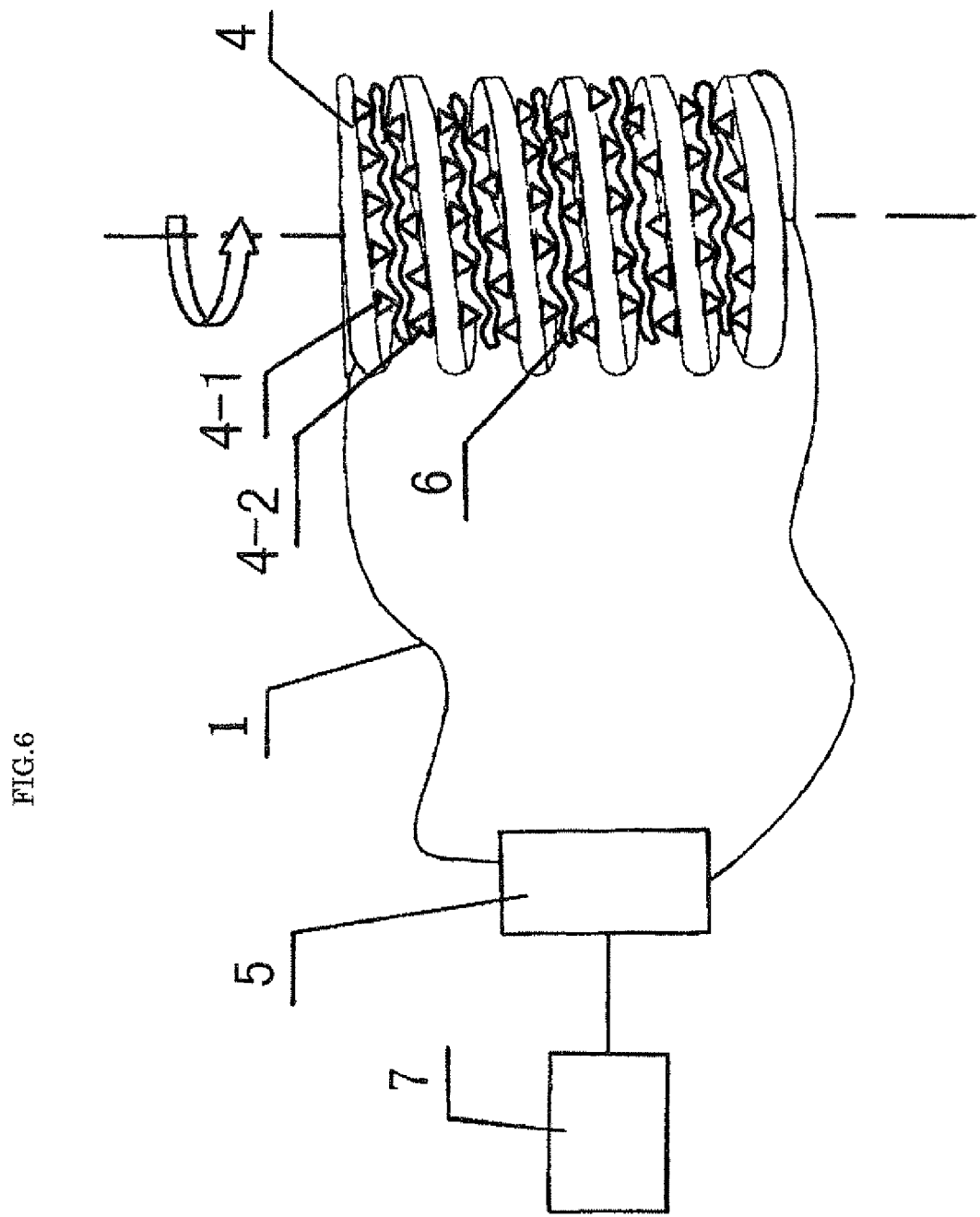
FIG. 6 is the view schematically illustrating the structure of the third embodiment according to the present invention.

As shown in FIG. 6, in this embodiment, the difference with the first embodiment is that the applied direction F of the outer stress is the direction of rotation, that is, the spiral member 4 is rotated from the upper or lower end. In this embodiment, the structures, connection relations and operational principles of other portions are the same as those in the first embodiment.

The Fourth Embodiment

Figure 7:
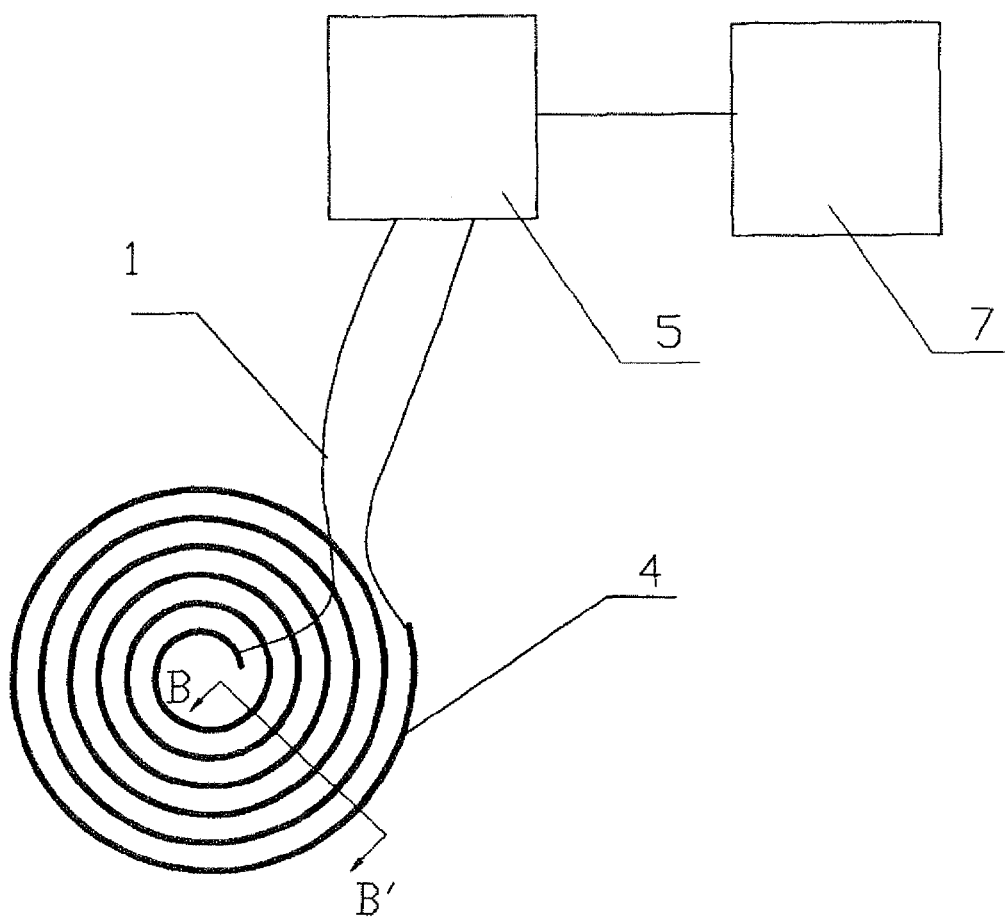
FIG. 7 is the view schematically illustrating the structure of the fourth embodiment according to the present invention.
Figure 8:
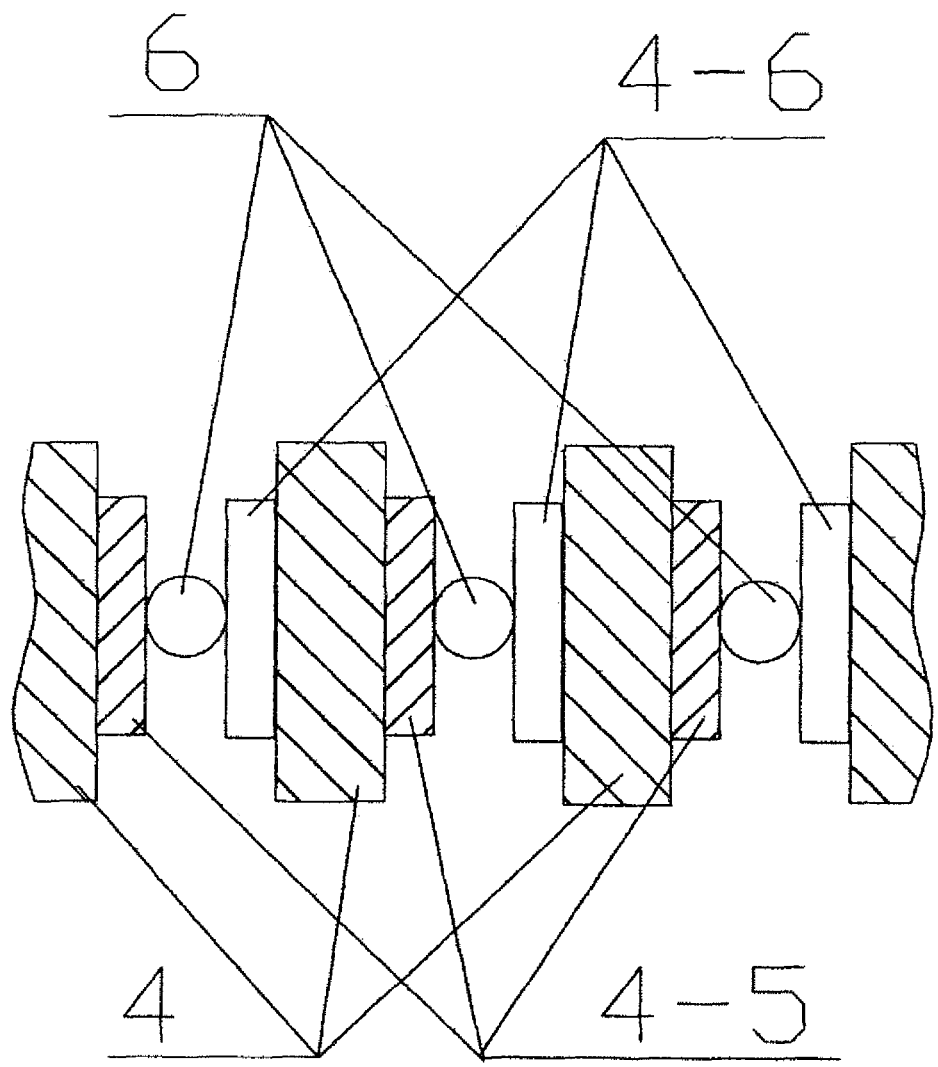
FIG. 8 is the schematically partial cross-sectional view taken along the direction B-B' in FIG. 7.

As shown in FIGS. 7 and 8, in this embodiment, the difference with the first embodiment is that the spiral member 4 is in the shape of flat coil spring as a whole. Two adjacent loops of the spring wire are the adjacent inner and outer loops of the spring wire. The first deformation teeth 4-5 on the outer surface of the inner loop of the spring wire and the first deformation teeth 4-6 on the inner surface of the outer loop of the spring wire are distributed in a staggered way with a first signal optical fiber 6 clamped therebetween. When the position of the inner end of the spiral member is changed with respect to the outer end thereof, the position of the two adjacent loops of the spring wire is changed such that the position between the deformation teeth distributed on the surface of the inner and outer loops of the spring wire respectively is changed. As a result, the bend curvature of the first signal optical fiber 6 clamped between the deformation teeth of the two adjacent loops is changed, and the power change of the light signal transmitted in the optical fiber 6 is caused. The first signal optical fiber 6 is connected by a transmission optical fiber 1 to a test unit 5, which is connected to a processing unit 7. In this embodiment, the structures, connection relations and operational principles of other portions are the same as those in the first embodiment.

The Fifth Embodiment

Figure 5:
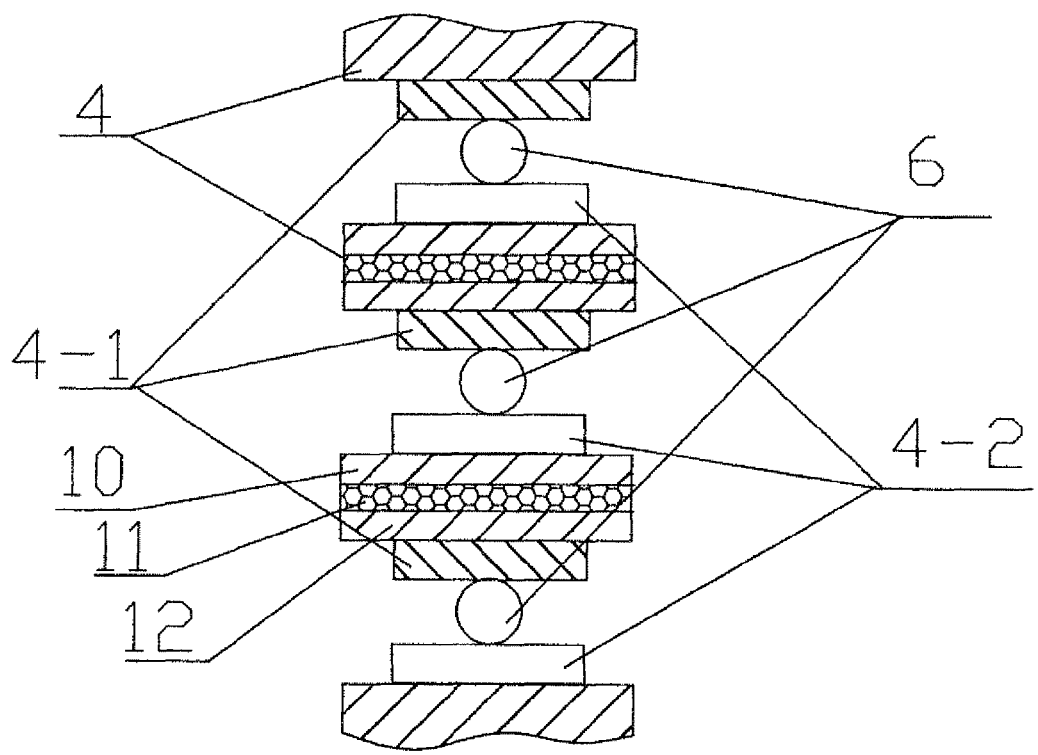
FIG. 5 is the partial cross-sectional view schematically illustrating the multi-loop spring wire which have a composite structure.

As shown in FIG. 5, in this embodiment, the difference with the first embodiment is that the spring wire forming the spiral member 4 is in a three-layer shape, comprising a layer 10 of an upper surface of the spring wire with the first deformation teeth 4-2 on the upper surface of the spring wire, a middle layer of elastic material, and a layer 12 of an lower surface of the spring wire with the first deformation teeth 4-1 on the lower surface of the spring wire. In this embodiment, the structures, connection relations and operational principles of other portions are the same as those in the first embodiment.

The Sixth Embodiment

Figure 9:
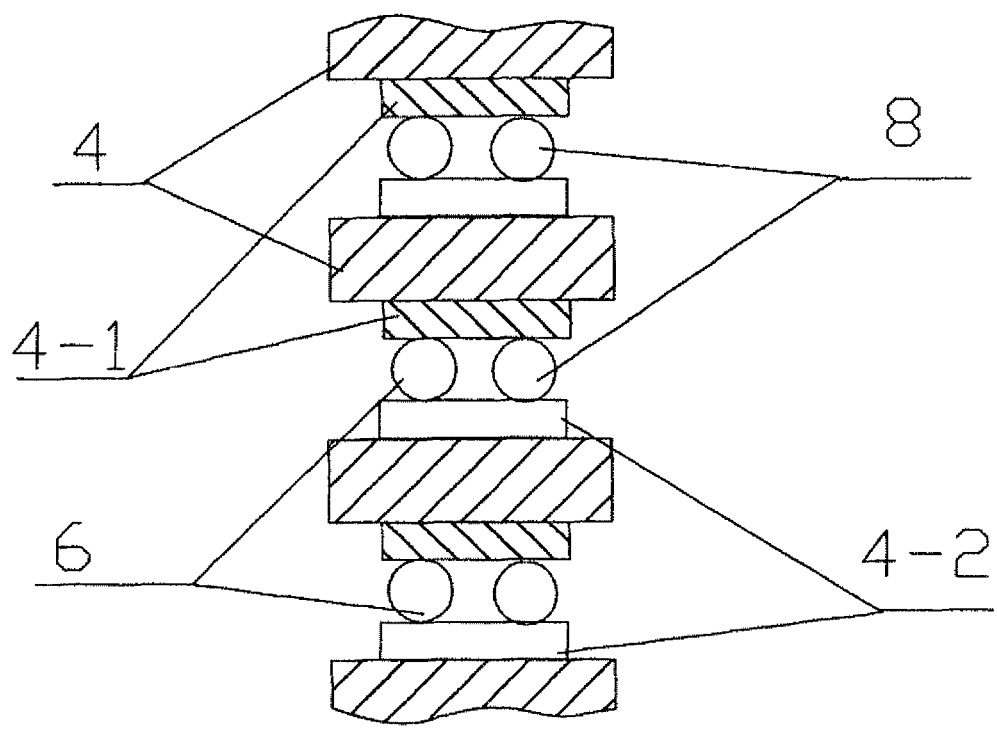
FIG. 9 is the view schematically illustrating the structure of the fifth embodiment according to the present invention.

As shown in FIG. 9, in this embodiment, the difference with the first embodiment is that a second signal optical fiber 8 is placed in parallel to the first signal optical fiber 6. The change in the power of the optical signal in the second signal optical fiber 8 may be detected by other test units (not shown in the drawing). In this embodiment, the structures, connection relations and operational principles of other portions are the same as those in the first embodiment.

The Seventh Embodiment

Figure 10:
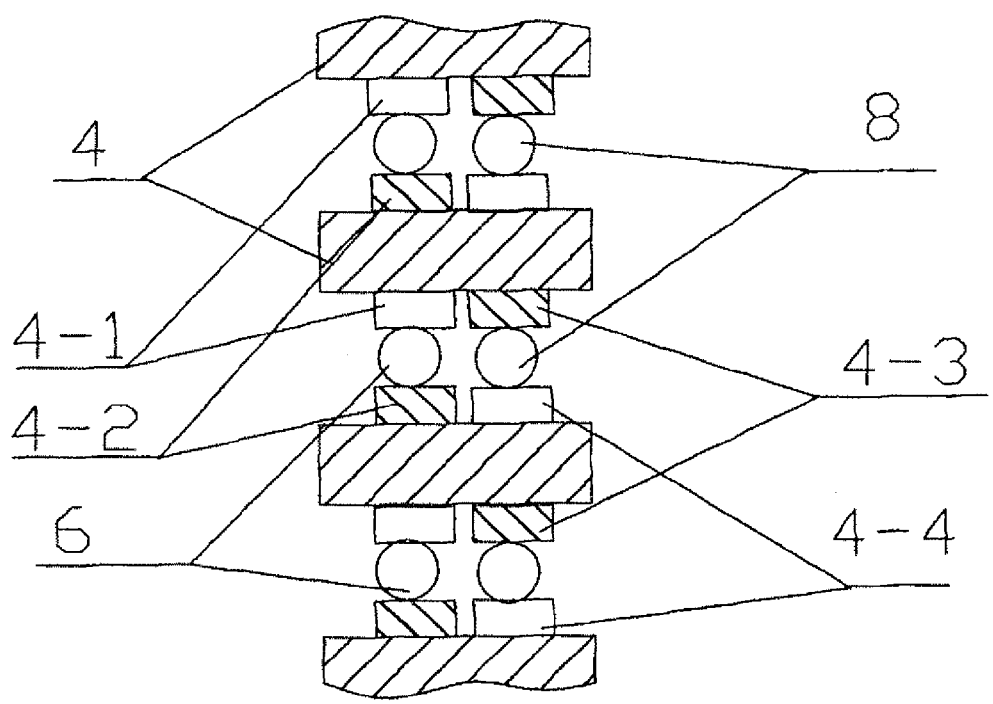
FIG. 10 is the view schematically illustrating the structure of the sixth embodiment according to the present invention.

As shown in FIG. 10, in this embodiment, the difference with the sixth embodiment is that second deformation teeth 4-3 on the lower surface of the spring wire and second deformation teeth 4-4 on the upper surface of the spring wire are provided, with a second signal optical fiber 8 clamped therebetween. In this embodiment, the structures, connection relations and operational principles of other portions are the same as those in the first embodiment.

The embodiments described above are only preferable embodiments of the present invention, and do not make any limitation to the present invention. Any simple variations, modifications and changes in the equivalent structures made to the above embodiments according to the technical spirit of the present invention still fall within the protection scope of the technical solutions of the present invention.

The invention claimed is:

1. A fiber optic sensor based on spiral structure, compromising: by a multi-loop spiral member formed by a spring wire, wherein a plurality of first deformation teeth are continuously distributed on an upper surface and a lower surface of the spring wire in a longitudinal direction along the spring wire; in two adjacent loops of the spring wire, the first deformation teeth on the lower surface of the upper loop of the spring wire and the first deformation teeth on the upper surface of the lower loop of the spring wire correspond to each other in a staggered way; a first signal optical fiber is clamped between the first deformation teeth on the lower surface of the upper loop of the spring wire and the deformation teeth on the upper surface of the lower loop of the spring wire; the positions of both ends of the spiral member are changed when a stress is applied thereon, and the distance between the two adjacent loops of the spring wire in the spiral member is changed such that the position between the first deformation teeth on the lower surface of the upper loop of the spring wire and the deformation teeth on the upper surface of the lower loop of the spring wire in the two loops of the spring wire is changed, and as a result, the bend curvature of the first signal optical fiber clamped between the two deformation teeth is changed; and the first signal optical fiber is connected to a test unit via a transmission optical fiber.

2. The fiber optic sensor based on spiral structure according to claim 1, wherein the spiral member formed by the spring wire is in a spiral shape or a shape of flat coil spring.

3. The fiber optic sensor based on spiral structure according to claim 1, wherein a layer of elastic material is provided between the upper and lower surfaces of the spring wire forming the spiral member.

4. The fiber optic sensor based on spiral structure according to claim 1, wherein the height of the first deformation teeth distributed on the surface of the spring wire or the distance between the first deformation teeth distributed on the upper surface of the spring wire or the distance between the first deformation teeth distributed on the lower surface of the spring wire is changed.

5. The fiber optic sensor based on spiral structure according to claim 1, wherein a second signal optical fiber is clamped in parallel to the first signal optical fiber between the first deformation teeth on the lower surface of the upper loop of the spring wire and the first deformation teeth on the upper surface of the lower loop of the spring wire in two adjacent loops of the spring wire.

6. The fiber optic sensor based on spiral structure according to claim 1, wherein second deformation teeth are provided on the upper and lower surfaces of the spring wire, respectively, and a second signal optical fiber is clamped between the second deformation teeth on the lower surface of the upper loop of the spring wire and the second deformation teeth on the upper surface of the lower loop of the spring wire in two adjacent loops of the spring wire.

7. The fiber optic sensor based on spiral structure according to claim 1, wherein the section of the spring wire is in a shape of round, elliptic, rectangular or circular ring.

8. The fiber optic sensor based on spiral structure according to claim 1, wherein the test unit is connected to a processing unit.

9. The fiber optic sensor based on spiral structure according to claim 1, wherein the signal optical fiber is an optical fiber having a layer for protection.

10. The fiber optic sensor based on spiral structure according claim 1, wherein the signal optical fiber is a multi-core optical fiber, a macromolecular polymer optical fiber or a photon crystal optical fiber.

\* \* \* \* \*